United States Patent
Madelaine et al.

(10) Patent No.: US 12,508,979 B2
(45) Date of Patent: Dec. 30, 2025

(54) LIGHTING DEVICE FOR A MOTOR VEHICLE

(71) Applicant: VALEO VISION, Bobigny (FR)

(72) Inventors: Mehdi Madelaine, Bobigny (FR); Nicolas Honnet, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/833,467

(22) PCT Filed: Jan. 31, 2023

(86) PCT No.: PCT/EP2023/052313
§ 371 (c)(1),
(2) Date: Jul. 26, 2024

(87) PCT Pub. No.: WO2023/144417
PCT Pub. Date: Aug. 3, 2023

(65) Prior Publication Data
US 2025/0108749 A1    Apr. 3, 2025

(30) Foreign Application Priority Data

Jan. 31, 2022    (FR) ...................................... 2200832

(51) Int. Cl.
*B60Q 1/068*    (2006.01)
*B60Q 1/00*    (2006.01)
(Continued)

(52) U.S. Cl.
CPC ........... *B60Q 1/0683* (2013.01); *B60Q 1/076* (2013.01); *B60Q 1/0029* (2013.01);
(Continued)

(58) Field of Classification Search
CPC .......... B60Q 1/06–124; B60Q 2200/32; B60Q 2200/36; B60Q 1/0029; B60Q 1/0035;
(Continued)

(56) References Cited

U.S. PATENT DOCUMENTS

| 4,742,435 | A | * | 5/1988 | Van Duyn | ............ | B60Q 1/0433 362/372 |
|---|---|---|---|---|---|---|
| 7,033,053 | B2 | | 4/2006 | Watson et al. | | |
| 9,475,421 | B2 | | 10/2016 | Burton et al. | | |

FOREIGN PATENT DOCUMENTS

| CN | 212005545 U | * | 11/2020 |
|---|---|---|---|
| DE | 10211816 A1 | | 10/2003 |

(Continued)

OTHER PUBLICATIONS

Machine translation of DE 102016107252 A1 retrieved from the FIT database of PE2E search. (Year: 2025).*

(Continued)

*Primary Examiner* — Colin J Cattanach
(74) *Attorney, Agent, or Firm* — Valeo Vision

(57) ABSTRACT

The invention relates to a luminous device for an automotive vehicle. The illumines devices including a main bracket on which a first bracket and a second bracket are mounted, each of the first bracket and second bracket being mounted so as to be movable on the main bracket. The first bracket supporting a first lighting module and the second bracket supporting a second lighting module. The luminous device further includes a mechanical connection device which connects the first bracket to the second bracket. A first adjustment device cooperates with the mechanical connection device and being capable of causing a movement of the mechanical connection device in relation to the main bracket. A second adjustment device via which the second bracket is mounted on the mechanical connection device and that is capable of causing a movement of the second bracket in relation to the mechanical connection device.

11 Claims, 4 Drawing Sheets

(51) Int. Cl.
*B60Q 1/04* (2006.01)
*B60Q 1/06* (2006.01)
*B60Q 1/076* (2006.01)
*B60Q 1/08* (2006.01)
*B60Q 1/11* (2006.01)
*B60Q 1/115* (2006.01)
*B60Q 1/12* (2006.01)
*B60Q 1/124* (2006.01)
*F21S 41/657* (2018.01)

(52) U.S. Cl.
CPC .......... *B60Q 1/0035* (2013.01); *B60Q 1/0041* (2013.01); *B60Q 1/0047* (2013.01); *B60Q 1/0052* (2013.01); *B60Q 1/0058* (2013.01); *B60Q 1/045* (2013.01); *B60Q 1/0483* (2013.01); *B60Q 1/06* (2013.01); *B60Q 1/08* (2013.01); *B60Q 1/11* (2013.01); *B60Q 1/115* (2013.01); *B60Q 1/122* (2013.01); *B60Q 1/124* (2013.01); *B60Q 2200/32* (2013.01); *B60Q 2200/36* (2013.01); *F21S 41/657* (2018.01)

(58) Field of Classification Search
CPC .. B60Q 1/0041; B60Q 1/0047; B60Q 1/0052; B60Q 1/0058; B60Q 1/045; B60Q 1/0483; F21S 41/657
See application file for complete search history.

(56) References Cited

FOREIGN PATENT DOCUMENTS

| DE | 102008011716 A1 | * | 9/2009 | .......... B60Q 1/0683 |
| DE | 102016107252 A1 | * | 11/2016 | .......... B60Q 1/0041 |
| EP | 2995500 A1 | | 3/2016 | |
| EP | 3647113 A1 | | 5/2020 | |
| EP | 3699028 A1 | | 8/2020 | |
| FR | 3029148 A1 | | 6/2016 | |
| WO | 2021209021 A1 | | 10/2021 | |

OTHER PUBLICATIONS

Machine translation of DE 102008011716 A1 retrieved from the FIT database of PE2E search. (Year: 2025).*
Machine translation of CN 212005545 U retrieved from the FIT database of PE2E search. (Year: 2025).*
European Patent Office, International Search Report (with English translation) and Written Opinion of corresponding International Application No. PCT/EP2023/052313, dated Apr. 14, 2023.

* cited by examiner

LIGHTING DEVICE FOR A MOTOR VEHICLE

TECHNICAL FIELD

The invention relates to a luminous device for an automotive vehicle.

The invention relates to the technical field of luminous devices, and more specifically of luminous devices including two lighting modules of an automotive vehicle.

BACKGROUND OF THE INVENTION

In the field of automotive vehicle lighting, the use of luminous devices having a plurality of lighting modules is known.

Indeed, it is known to use lighting modules able to emit a segmented light beam in combination with lighting modules able to emit a light beam with a flat upper cut-off. The combination of these two modules makes it possible, inter alia, to provide different statutory lighting functions, by controlling one or both of the lighting modules to emit complex light beams. It is however necessary to control the position of the light beams in relation to one another, and therefore to be able to adjust the vertical and/or horizontal orientations of the lighting modules. Indeed, to modify the vertical orientation of one of the lighting modules, the light distribution of the overall beam emitted by the two lighting modules is thus modified, which may not meet the statutory requirements applicable to the function to be provided.

There is therefore a need for an automotive vehicle lighting system incorporating a first lighting module able to emit a first light beam and a second lighting module able to emit a second light beam, the vertical orientation of which can be adjusted while maintaining the ability of the lighting system to provide statutory lighting functions.

The invention therefore falls within this context and addresses all of the aforementioned drawbacks. The invention is therefore intended to provide a luminous device including a first lighting module and a second lighting module, wherein the orientation of each lighting module can be adjusted in relation to the other, and the two lighting modules can also be adjusted simultaneously.

SUMMARY OF THE INVENTION

The invention relates to a luminous device for an automotive vehicle, comprising a main bracket on which a first bracket and a second bracket are mounted, each of the first bracket and second bracket being mounted so as to be movable on the main bracket; the first bracket supporting a first lighting module and the second bracket supporting a second lighting module; the luminous device comprising a mechanical connection device which connects the first bracket to the second bracket; a first adjustment device cooperating with the mechanical connection device and being capable of causing a movement of the mechanical connection device in relation to the main bracket; a second adjustment device via which the second bracket is mounted on the mechanical connection device and that is capable of causing a movement of the second bracket in relation to the mechanical connection device.

The first bracket and the second bracket may be mounted on the main bracket so that said first bracket is substantially parallel to said second bracket. The first lighting module can thus be arranged substantially parallel to the second lighting module. The first bracket may be mounted fixedly on the mechanical connection device. The mechanical connection device may have an upper first end and a lower second end. The first bracket may be mounted fixedly on the first end of the mechanical connection device. The mechanical connection device may have a first adjustment device and a second adjustment device.

The first adjustment device can cause a substantially vertical movement of the mechanical connection device in relation to the main bracket. The substantially vertical movement of the mechanical connection device may drive a simultaneous movement of the first bracket and of the second bracket in relation to the main bracket.

The second adjustment device may cause a relative movement of the second bracket in relation to the first bracket. Thus, the second adjustment device can enable adjustment of the center-to-center distance between the first bracket and the second bracket.

Advantageously, the first bracket is connected to the main bracket by two first ball-and-socket joints, said first ball-and-socket joints defining a first rotation axis about which the first bracket can pivot.

The main bracket may have two first spherical heads that may be arranged on both sides of the first bracket. The first bracket may have two first partially spherical seats. The two first seats may be arranged on the two sides of said first bracket, thereby enabling the first spherical heads of the main bracket to be seated in the two first seats of the first bracket. Each pair including the first seat and the first head can form a first ball-and-socket joint. The first ball-and-socket joints can together define the first rotation axis, which can enable the movement of the first bracket in relation to the main bracket.

Advantageously, the second bracket is connected to the main bracket by at least two second ball-and-socket joints, said second ball-and-socket joints defining a second rotation axis about which the second bracket can pivot.

The main bracket may have two second spherical heads that may be arranged on both sides of the second bracket. The second bracket may have two second partially spherical seats. The two second seats may be arranged on the two sides of said second bracket, thereby enabling the second spherical heads of the main bracket to be seated in the two second seats of the second bracket. Each pair including the second seat and the second head can form a second ball-and-socket joint. The second ball-and-socket joints can together define the second rotation axis, which can enable the movement of the second bracket in relation to the main bracket.

Advantageously, the first rotation axis and the second rotation axis are substantially parallel to one another.

The first rotation axis and the second rotation axis may be substantially horizontal axes, notably to enable adjustment of the first and second luminous devices. The first luminous device and the second luminous device may each have a light source emitting respectively a first light beam and a second light beam. The first and second rotation axes can thus enable adjustment of the respective range of the first and second light beams.

In another embodiment, the first rotation axis and the second rotation axis may be substantially vertical axes, notably to enable adjustment of the horizontal orientation of the first and second light beams.

Advantageously, the mechanical connection device includes a connecting rod connected, at a first of the ends thereof, to the first bracket and, at a second of the ends thereof, to the second adjustment device, and the first adjustment device includes an actuator that is movable in translation and connected to a shaft of said mechanical connection device, said shaft being arranged to transform a translational movement of said actuator into a rotational movement of the first bracket about the first rotation axis and of the second bracket about the second rotation axis.

The connecting rod may be connected respectively to the first bracket or to the second bracket. Using the connecting rod can enable the first and second plates to be inclined in relation to the mechanical connection device, during displacement in vertical translation of said mechanical connection device.

The mechanical connection device includes a shaft that can be connected to an actuator of the first adjustment device. The shaft can extend perpendicularly from the connecting rod of the connection device. The shaft can be positioned between the first end and the second end of the connecting rod.

The actuator may be movable in vertical translation and may, in one embodiment, include an electric motor enabling automatic adjustment of the luminous device. The actuator can drive the mechanical connection device, which can in turn simultaneously drive the rotational movement of the first bracket about the first rotation axis thereof, and can drive the rotational movement of the second bracket about the second rotation axis thereof.

Advantageously, the actuator is movable in translation in a direction substantially parallel to a direction of extension of the connecting rod.

The actuator can drive the displacement in vertical translation of the mechanical connection device.

Advantageously, the second bracket is connected, by a fastening member, to the second adjustment device, and the second adjustment device is able to drive a displacement of the fastening member in relation to the first end.

The second bracket can have a fastening member that can be mounted on the second adjustment device. The fastening member may cooperate with the second adjustment device to drive the displacement of the second bracket in relation to the first and second ends of the mechanical connection device.

The displacement of the fastening member by the second adjustment device can drive the rotational movement of the second bracket about the second rotation axis thereof. The second adjustment device can make it possible to drive the rotational movement of the second bracket about the second rotation axis thereof.

Advantageously, the second adjustment device includes a threaded screw seated in a threaded orifice of the second bracket, forming the fastening member, and the mechanical connection device is mounted on said screw by a ball-and-socket joint.

The fastening member of the second bracket may have an orifice. The threaded screw seated in the orifice may form a gripping member that may be used to manually adjust the position of the second bracket. The screw may include a spherical head and the connection device may include, at the second end thereof, a partially spherical seat, together forming the ball-and-socket joint.

Advantageously, the luminous device includes a housing fastened to the main bracket, the first bracket and the second bracket, the first and second lighting modules, the first adjustment device and the second adjustment device being seated together in this housing, and the luminous device includes a chassis to which is fastened the housing including fastening members for fastening the luminous device to the automotive vehicle.

The housing may be fastened by snap-fitting to the main bracket. In another embodiment, the housing may be fastened to the main bracket by screwing. The housing may enable the luminous device to be sealed in relation to the automotive vehicle.

The chassis of the luminous device may enable the join between the housing and the automotive vehicle. The housing may thus be mounted on the chassis itself including the fastening members for fastening to the automotive vehicle.

Advantageously, the housing is fastened to the chassis by a ball-and-socket joint, by a third adjustment device, and by a fourth adjustment device, the ball-and-socket joint, the third adjustment device and the fourth adjustment device forming a trihedron.

The third adjustment device and the fourth adjustment device may be arranged on the two sides of the housing. The third adjustment device, the fourth adjustment device, and the ball-and-socket joint can in pairs form rotation axes of the housing in relation to the chassis. These rotation axes can then enable adjustment of the housing of the luminous device in relation to the chassis and therefore in relation to the automotive vehicle.

Advantageously, the second lighting module is arranged to emit a second light beam with a flat cut-off.

The second lighting module can emit a beam with a substantially flat cut-off, of the statutory low beam type.

Advantageously, the first lighting module is arranged to emit a first segmented light beam, each segment of which can be controlled selectively, the first light beam extending at least partially above the second light beam.

The first lighting module can emit a segmented light beam, in which each segment can be controlled selectively. This type of module can make it possible, for example, to provide anti-dazzle high-beam lighting functions, in which some pixels of the high beam can be turned off or attenuated for a target vehicle being followed or passed, ground writing lighting functions, in which some pixels of a low beam are overbrightened or attenuated in order to display a pictogram, ground marking lighting functions, in which some pixels of the low beam are overbrightened or attenuated in order to materialize markings such as lines, or also welcome lighting functions, in which certain pixels of a light beam which is intended to be projected onto the ground or onto a wall are overbrightened or attenuated in order to display a pictogram when unlocking and/or starting the vehicle.

BRIEF DESCRIPTION OF THE DRAWINGS

Further advantages and features of the present invention will now be described using examples that are purely illustrative and by no means limit the scope of the invention, and on the basis of the appended drawings, in which the various figures show.

Throughout the following description, elements that are identical in terms of structure or function and that appear in different figures retain the same reference signs, unless otherwise specified.

DETAILED DESCRIPTION OF THE INVENTION

Figure 1:
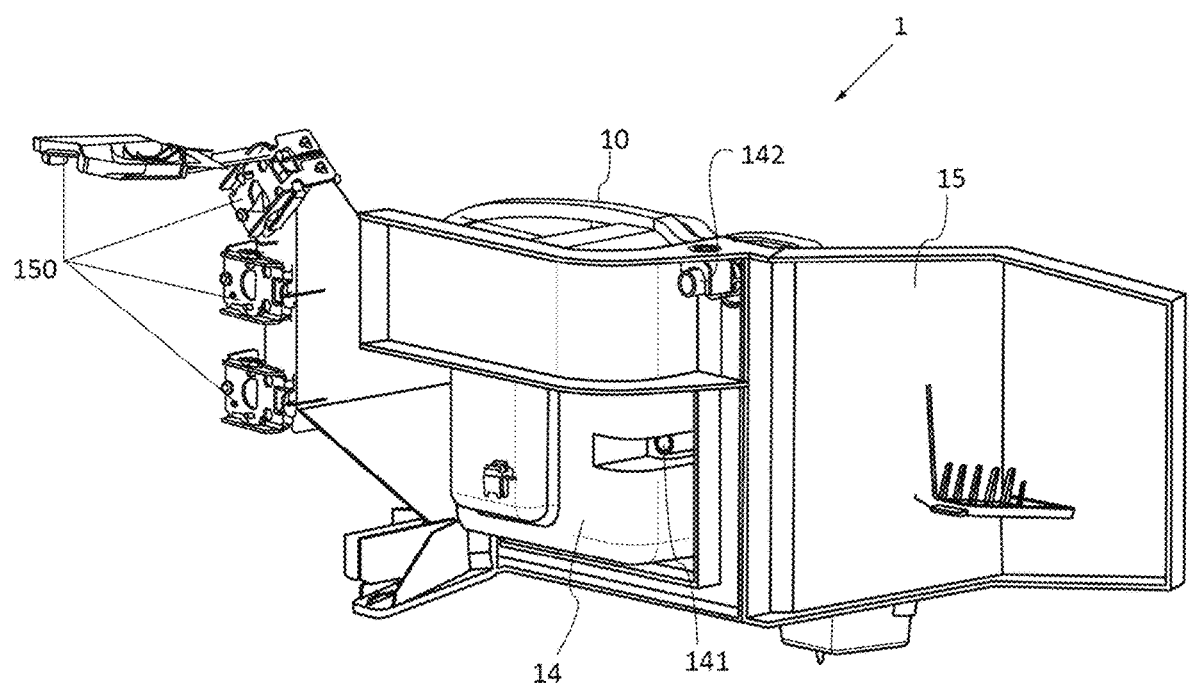
FIG. 1 is a schematic rear perspective view of a luminous device including a chassis according to one embodiment.
Figure 2:
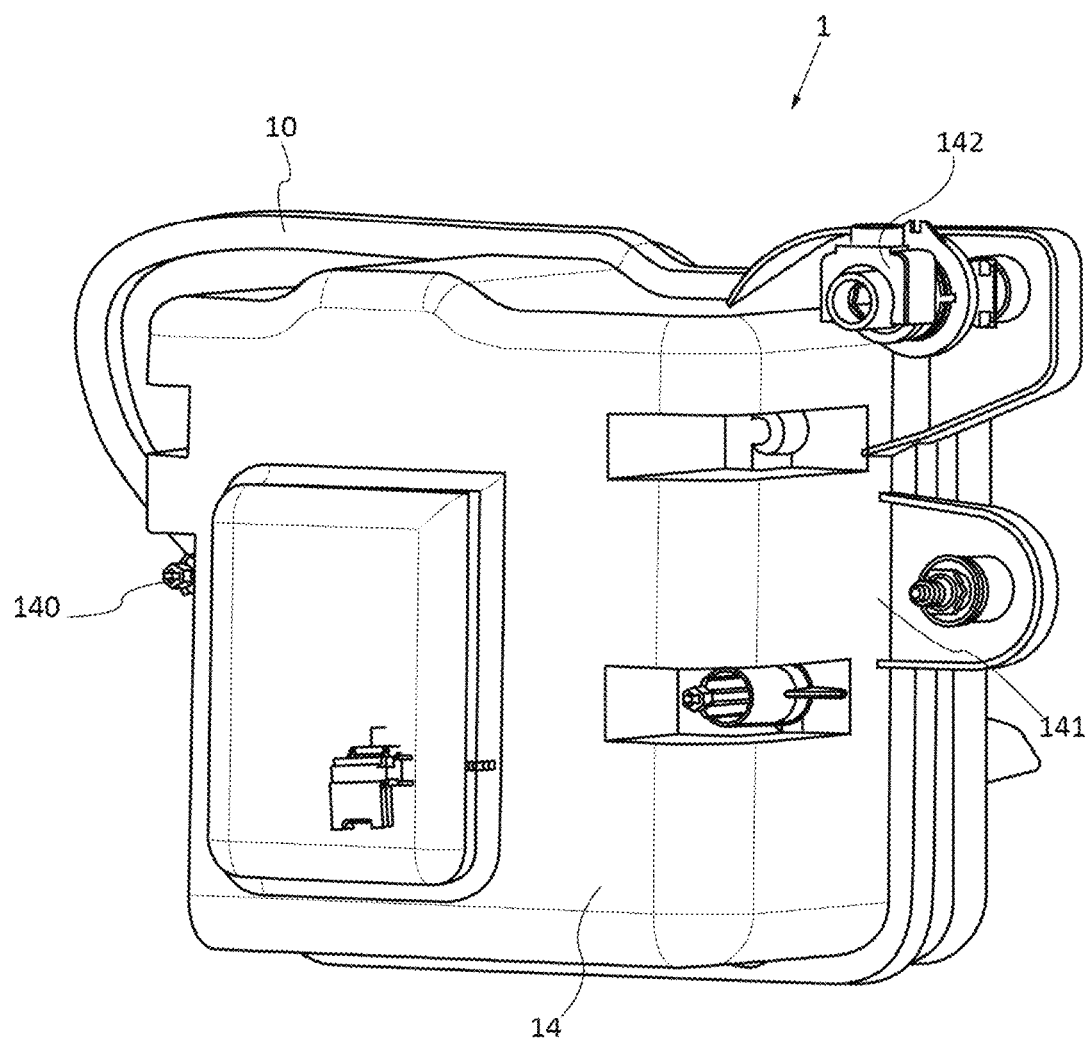
FIG. 2 is a schematic rear view of a housing of a luminous device according to one embodiment.

FIG. 1 shows an embodiment of a luminous device for an automotive vehicle including a chassis. FIG. 2 shows the same luminous device, but with the chassis removed. The luminous device is described with reference to FIG. 3 and FIG. 4.

Figure 3:
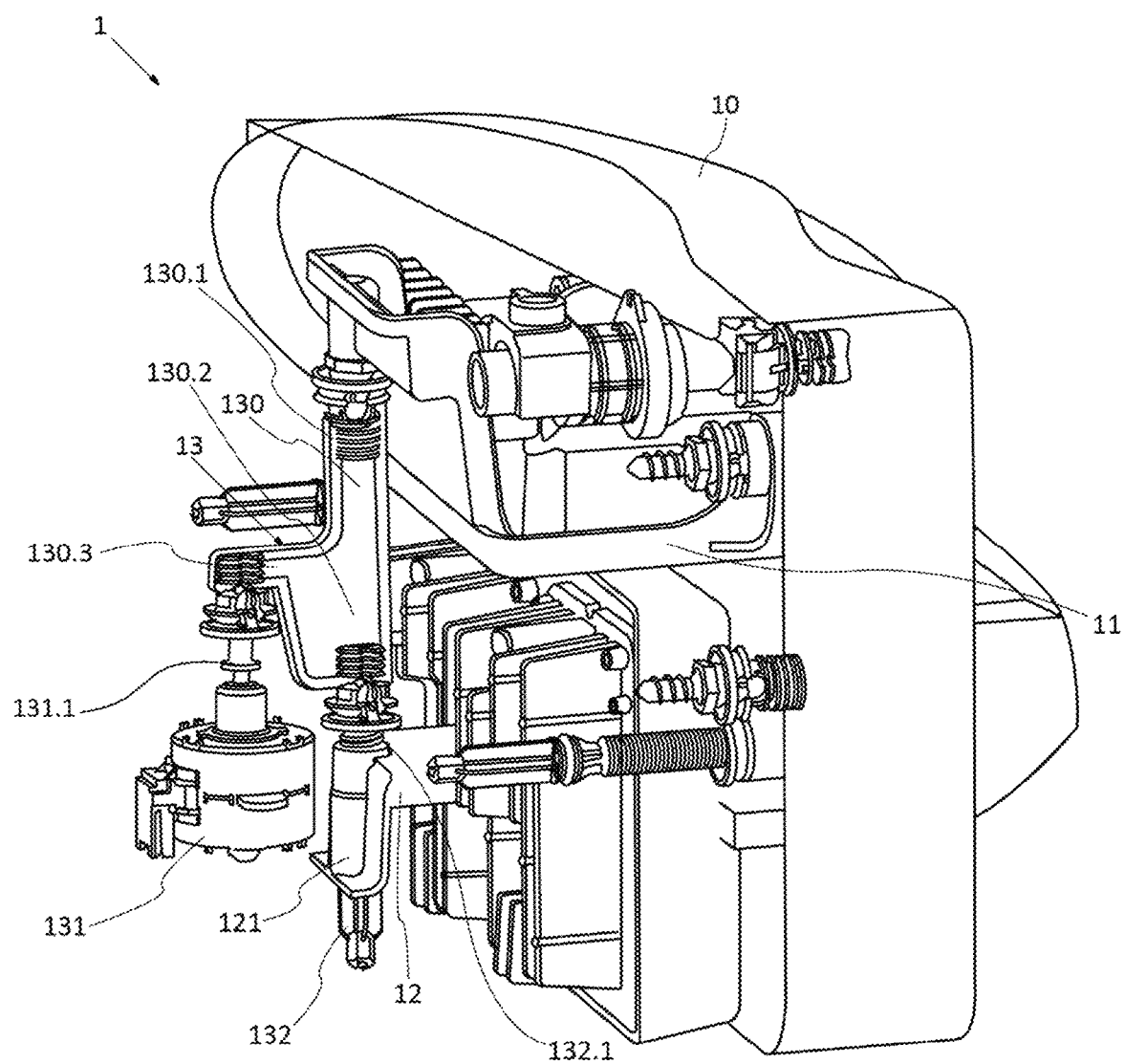
FIG. 3 is a schematic rear perspective view of a luminous device with the housing removed.
Figure 4:
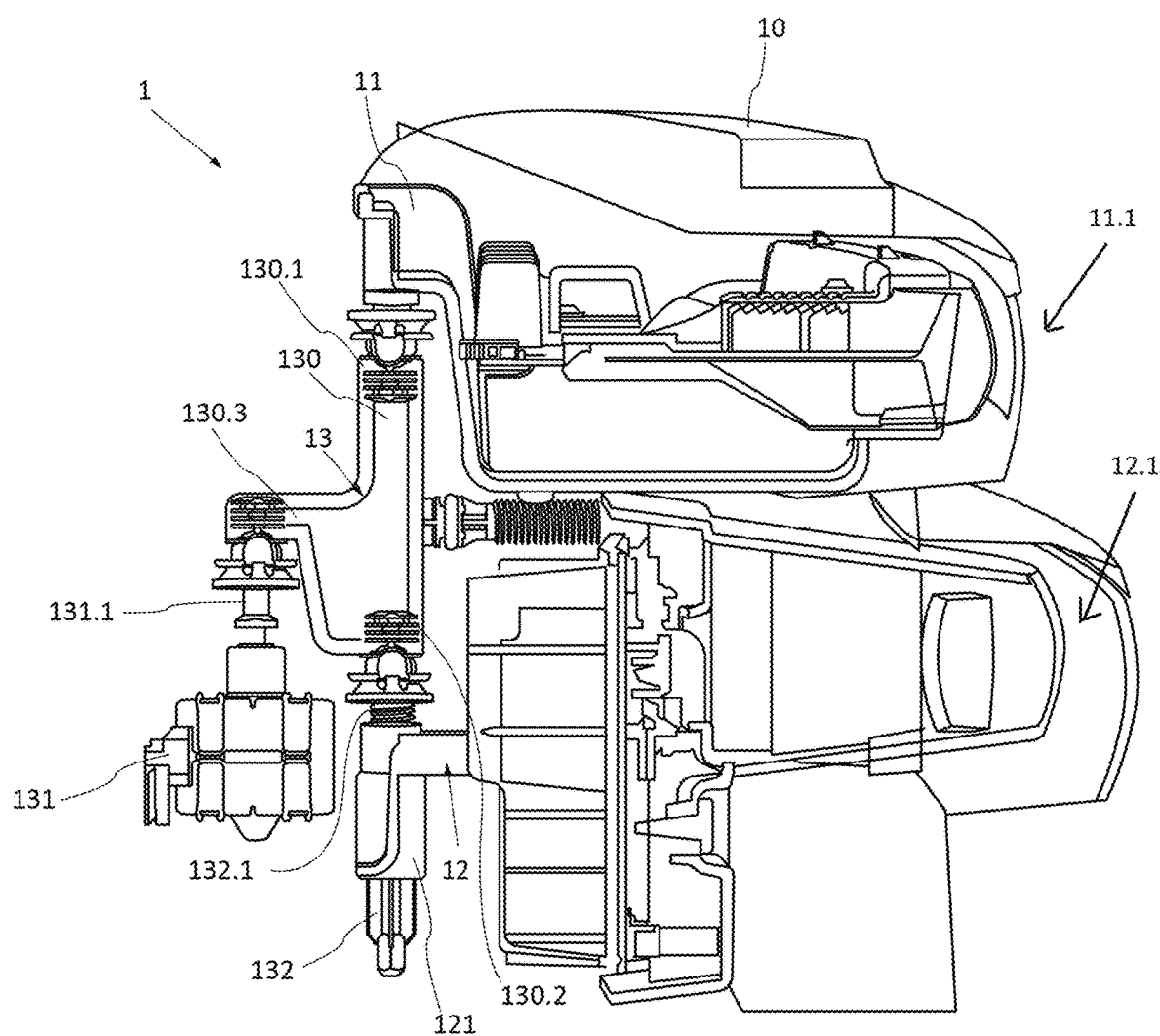
FIG. 4 is a schematic cross section view along the axis Y of a luminous device with the housing removed.

The luminous device 1 shown in FIG. 3 and FIG. 4 includes a main bracket 10. A first bracket 11 and a second bracket 12 are mounted on the main bracket 10 so that said first bracket 11 is parallel to said second bracket 12. The main bracket 10 has two first spherical heads arranged on both sides of said first bracket 11 and two second spherical heads arranged on both sides of the second bracket 12. The first bracket 11 has two first partially spherical seats arranged on both sides of said first bracket 11 and the second bracket 12 has two second partially spherical seats arranged on both sides of said second bracket 12. The two first heads and the two second heads form with the two first seats and the two second seats respectively two first ball-and-socket joints and two second ball-and-socket joints. Said first ball-and-socket joints define a first rotation axis about which the first bracket 11 pivots in relation to the main bracket 10. Said second ball-and-socket joints define a second rotation axis about which the second bracket 12 pivots in relation to the main bracket 10. The first rotation axis and the second rotation axis are parallel to one another.

The first bracket 11 and the second bracket 12 bear respectively a first lighting module 11.1 and a second lighting module 12.1, said first module 11.1 and said second module 12.1 being substantially parallel. The first lighting module 11.1 and the second lighting module 12.1 each have a light source emitting respectively a first light beam and a second light beam. The rotation of the first bracket 11 and of the second bracket 12 enables the respective range of the first and second light beams to be adjusted.

The luminous device 1 has a mechanical connection device 13 which connects the first bracket 11 to the second bracket 12. The mechanical connection device 13 includes a connecting rod 130 having a first end 130.1 and a second end 130.2. The connecting rod 130 has a shaft 130.3 extending perpendicularly between the first end 130.1 and the second end 130.2, said connecting rod 130 and said shaft 130.3 forming a T. The mechanical connection device 13 is movable in translation along a vertical axis in relation to the main bracket 10. The first bracket 11 is mounted fixedly on the first end 130.1 of the mechanical connection device 13.

The mechanical connection device 13 has a first adjustment device 131 and a second adjustment device 132.

The first adjustment device 131 includes an actuator 131.1 that is movable in translation, mounted on the shaft 130.3 by a ball-and-socket joint formed by a head carried by the actuator 131.1, mounted in a partially spherical seat mounted on the shaft 130.3 of the connecting rod 130. Thus, the first adjustment device 131 actuates the actuator 131.1 by driving the vertical translation thereof, thus driving the vertical translation of the mechanical connection device 13 in relation to the main bracket 10, the first bracket 11 and the second bracket 12 being driven in a rotational movement respectively about the first rotation axis and the second rotation axis. The vertical movement of the mechanical connection device 13 drives a simultaneous movement of the first bracket 11 and of the second bracket 12 in relation to the main bracket 10.

The second adjustment device 132 has a screw 132.1 forming a gripping member. The second adjustment device 132 has a partially spherical seat and the screw 132.1 has a spherical head, the head of the screw 132.1 being mounted in the seat of the second adjustment device 132 to form a ball-and-socket joint. The second bracket 12 has a fastening member 121 with a threaded orifice into which the threaded screw 132.1 of the second adjustment device 132 is inserted. The screw 132.1 enables manual adjustment of the position of the second bracket 12 in relation to the mechanical connection device 13. The second bracket 12 is mounted so as to be movable on the second end 130.2 of the connecting rod 130. The second adjustment device 132 causes a displacement of the fastening member 121 in relation to the first end 130.1, causing a relative movement of the second bracket 12 in relation to the first bracket 11 such as to adjust the center-to-center distance between the first bracket 11 and the second bracket 12.

The luminous device 1 has a housing 14 described in FIG. 2. The housing 14 is fastened to the main bracket 10 by snap-fitting. The housing 14 includes the first bracket 11, the second bracket 12, the first lighting module, the second lighting module, the mechanical connection device 13, the first adjustment device 131 and the second adjustment device 132.

The luminous device 1 has a chassis 15 described in FIG. 1. The chassis 15 has fastening members 150 for fastening the housing 14 to the automotive vehicle. The chassis 15 has fastening members 121, a ball-and-socket joint 142, a third adjustment device 140 and a fourth adjustment device 141. The chassis 15 is connected to the housing 14 by the ball-and-socket joint 142, the third adjustment device 140 and the fourth adjustment device 141. The third adjustment device 140 and the fourth adjustment device 141 are arranged on the two sides of the housing 14. The third adjustment device 140, the fourth adjustment device 141, and the ball-and-socket joint 142 in pairs form rotation axes of the housing 14 in relation to the chassis 15, enabling the housing 14 to move in relation to the chassis 15 and therefore in relation to the automotive vehicle.

The above description clearly explains how the invention allows its stated objectives to be achieved, specifically to provide a luminous device including a first lighting module and a second lighting module, wherein the orientation of each lighting module can be adjusted in relation to the other, and the two lighting modules can also be adjusted simultaneously, by providing a luminous device for an automotive vehicle, comprising a main bracket on which a first bracket and a second bracket are mounted, each of the first bracket and second bracket being mounted so as to be movable on the main bracket; the first bracket supporting a first lighting module and the second bracket supporting a second lighting module; the luminous device comprising a mechanical connection device which connects the first bracket to the second bracket; a first adjustment device cooperating with the mechanical connection device and being capable of causing a movement of the mechanical connection device in relation to the main bracket; a second adjustment device via which the second bracket is mounted on the mechanical connection device and that is capable of causing a movement of the second bracket in relation to the mechanical connection device.

In any event, the invention is not limited to the embodiments specifically described in this document, and particularly extends to all equivalent means and to any technically operative combination of these means.

What is claimed is:

1. A luminous device for an automotive vehicle, comprising a main bracket on which a first bracket and a second bracket are mounted, each of the first bracket and second bracket being mounted so as to be movable on the main bracket; the first bracket supporting a first lighting module and the second bracket supporting a second lighting module;
- a mechanical connection device which connects the first bracket to the second bracket;
- a first adjustment device cooperating with the mechanical connection device and being capable of causing a movement of the mechanical connection device in relation to the main bracket;
- a second adjustment device via which the second bracket is mounted on the mechanical connection device and that is capable of causing a movement of the second bracket in relation to the mechanical connection device;
- wherein the first adjustment device can cause a substantially vertical movement of the mechanical connection device in relation to the main bracket, with the substantially vertical movement being substantially perpendicular to an optical axis and causing simultaneous movement of the first bracket and the second bracket relative to the main bracket, and
- the mechanical connecting device includes a connecting rod connected to the first bracket at one end and to the second adjustment device at the opposite end, and the first adjustment device includes an actuator movable in translation and connected to a shaft of the mechanical connection device, the shaft being arranged to transform a translational movement of the actuator into a rotational movement of the first bracket around a first rotation axis and of the second bracket around a second rotation axis, and in that the actuator can cause the vertical translational movement of the mechanical connecting device.

2. The luminous device for an automotive vehicle as claimed in claim 1, wherein the first bracket is connected to the main bracket by two first ball-and-socket joints, the first ball-and-socket joints defining the first rotation axis about which the first bracket can pivot.

3. The luminous device for an automotive vehicle as claimed in claim 1, wherein the second bracket is connected to the main bracket by at least two second ball-and-socket joints, the second ball-and-socket joints defining the second rotation axis about which the second bracket can pivot.

4. The luminous device for an automotive vehicle as claimed in claim 1, wherein the first rotation axis and the second rotation axis are substantially parallel to one another.

5. The luminous device for an automotive vehicle as claimed in claim 1, wherein the actuator is movable in translation in a direction substantially parallel to a direction of extension of the connecting rod.

6. The luminous device for an automotive vehicle as claimed in claim 5, wherein the second bracket is connected, by a fastening member, to the second adjustment device, and wherein the second adjustment device is able to drive a displacement of the fastening member in relation to the one end.

7. The luminous device for an automotive vehicle as claimed in claim 6, wherein the second adjustment device includes a threaded screw seated in a threaded orifice of the second bracket, forming the fastening member, and wherein the mechanical connection device is mounted on the screw by a ball-and-socket joint.

8. The luminous device for an automotive vehicle as claimed in claim 1, further comprising a housing fastened to the main bracket, the first bracket and the second bracket, the first and second lighting modules, the first adjustment device and the second adjustment device being seated together in the housing, and a chassis to which the housing is fastened including fastening members for fastening the luminous device to the automotive vehicle.

9. The luminous device for an automotive vehicle as claimed in claim 8, wherein the housing is fastened to the chassis by a ball-and-socket joint, by a third adjustment device, and by a fourth adjustment device, the ball-and-socket joint, the third adjustment device and the fourth adjustment device forming a trihedron.

10. The luminous device for an automotive vehicle as claimed in claim 1, wherein the second lighting module is arranged to emit a second light beam with a flat cut-off.

11. The luminous device for an automotive vehicle as claimed in claim 10, wherein the first lighting module is arranged to emit a first segmented light beam, each segment of which can be controlled selectively, the first segmented light beam extending at least partially above the second light beam.

* * * * *